United States Patent
Carns et al.

(10) Patent No.: US 6,235,323 B1
(45) Date of Patent: *May 22, 2001

(54) TEA BAG FOR ICED TEA

(75) Inventors: Lawrence G. Carns, Plain City; Johannes Cilliers, Marysville, both of OH (US)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,068

(22) Filed: Oct. 22, 1998

Related U.S. Application Data

(60) Provisional application No. 60/092,449, filed on Jul. 9, 1998, and provisional application No. 60/062,736, filed on Oct. 23, 1997.

(51) Int. Cl.⁷ ..................................................... A23F 3/14
(52) U.S. Cl. .............................. 426/78; 426/77; 426/435; 426/597
(58) Field of Search ............................... 426/77–84, 435, 426/597

(56) References Cited

U.S. PATENT DOCUMENTS

| | | | |
|---|---|---|---|
| 2,022,467 | * 11/1935 | Heyman | 426/78 |
| 2,110,732 | * 3/1938 | Kane | 406/78 |
| 3,065,077 | * 11/1962 | Mishkin et al. | 426/597 |
| 3,914,439 | * 10/1975 | Graves | 426/78 |
| 3,950,553 | * 4/1976 | Gasser et al. | 426/597 |
| 3,959,497 | * 5/1976 | Takino | 426/597 |
| 4,004,038 | * 1/1977 | Wickremasinghe | 426/597 |
| 4,051,264 | * 9/1977 | Sanderson et al. | 426/597 |
| 4,076,847 | * 2/1978 | Johnson et al. | 426/78 |
| 4,156,024 | * 5/1979 | Husaini | 426/597 |
| 4,357,361 | * 11/1982 | Lunder et al. | 426/597 |
| 4,490,402 | * 12/1984 | Lunder et al. | 426/597 |
| 4,639,375 | * 1/1987 | Tsai | 426/597 |
| 4,826,695 | * 5/1989 | Tanner | 426/78 |
| 5,094,860 | * 3/1992 | Newhall et al. | 426/78 |
| 5,318,791 | * 6/1994 | Millman et al. | 426/435 |
| 5,554,400 | * 9/1996 | Stipp | 426/78 |

FOREIGN PATENT DOCUMENTS

| | | | |
|---|---|---|---|
| 3701230 | * 8/1988 | (DE) | 426/78 |
| 2 190 372 | 2/1974 | (FR) | . |
| 29 891 | of 1911 | (GB) | . |
| 940867 | 11/1963 | (GB) | . |
| 1251079 | * 10/1971 | (GB) | 426/597 |
| 1 428394 | 3/1976 | (GB) | . |
| 2074838 | * 11/1981 | (GB) | 426/597 |
| 2 095 968 | 10/1982 | (GB) | . |
| 2 208 096 | 3/1989 | (GB) | . |
| 1-296941 | * 11/1989 | (JP) | 426/78 |
| 4-44714 | * 2/1992 | (JP) | 426/435 |
| 6616898 | * 6/1967 | (NL) | 426/78 |
| 73/4387 | 6/1973 | (ZA) | . |

OTHER PUBLICATIONS

Japanese Abstract No. XP–002090595. Database WPI, Section Ch, Week 8824, Derwent Publications Ltd., London GB. Nov. 23, 1997.

Japanese Abstract No. XP–002089135. Chemical abstract vol., 85, No. 3, 1976. Columbus, Ohio, U.S. M. Bockuchava, "Use of green instant tea to enrich different varieties of tea".

Japanese Abstract No. XP–002089137. Database WPI, Section Ch, Week 8823, Derwent Publications Ltd., London, GB, No date.

* cited by examiner

*Primary Examiner*—Steven Weinstein
(74) *Attorney, Agent, or Firm*—Pennie & Edmonds LLP

(57) ABSTRACT

A tea bag for ice tea beverages. The tea bag contains a tea mixture made up of about 30% to about 95% by weight of tea leaves, and about 5% to about 70% by weight of dried soluble tea solids. The tea bag may be immersed in cold water to provide a tea beverage of acceptable color and flavor in less than about 10 minutes.

21 Claims, No Drawings

TEA BAG FOR ICED TEA

This application is based on provisional application No. 60/062,736 filed Oct. 23, 1997 and provisional application No. 60/092,449 filed Jul. 9, 1998.

FIELD OF THE INVENTION

This invention relates to a tea bag which may be used to make iced tea beverages. The invention also relates to a method for making iced tea.

BACKGROUND OF THE INVENTION

Traditionally, ice tea is made by extracting soluble tea solids from tea leaves and then adding various flavoring agents such as sugar, lemon, mint, peach and the like. The beverage is then cooled. This method results in a good quality tea product. However, it is time consuming since the consumer must heat water, steep the tea bags, and then cool the hot product.

Instant tea powders are available and may be used to rapidly produce a tea beverage at reduced temperatures. However, instant tea powders usually do not provide an iced tea beverage of quality comparable to that produced by brewing tea leaves.

Further, while it is possible to make an ice tea beverage by steeping tea leaves in water at reduced temperatures, the beverage obtained is poor unless it is steeped for excessively long periods of time. The extraction is too slow and the beverage has a poor color and a flavor which lacks body.

This has lead to a situation where many consumers merely purchase ready-to-drink iced tea beverages.

Therefore there is a need for a tea which may be rapidly extracted at reduced temperatures to provide an acceptable extract for iced tea drinks.

SUMMARY OF THE INVENTION

Accordingly, in one aspect, this invention provides a tea bag for ice tea beverages, the tea bag containing a tea mixture comprising:

about 30% to about 95% by weight of tea leaves; and about 5% to about 70% by weight of dried soluble tea solids.

Preferably the tea mixture further comprises tea flavor or aroma. The tea flavor or aroma may be encapsulated into the dried soluble tea solids.

The dried soluble tea solids are preferably coated on the tea leaves.

The tea leaves are preferably thermally treated tea leaves; for example steam treated tea leaves. This provides the advantage of reducing the possibility of microbial contamination.

The dried soluble tea solids may contain solubilized tannin components.

In another aspect, this invention provides a tea bag for ice tea beverages, the tea bag containing a tea mixture comprising tea leaves and dried soluble tea solids, the tea bag providing a beverage having a color of at least about 0.7 absorbance at 420 nm and using a cuvet pathlength of 1 cm when immersed in 250 ml of water at 22° C. for about 90 seconds at a tea mixture concentration of about 10 g/l.

In a yet further aspect, this invention provides a tea bag for ice tea beverages, the tea bag containing a tea mixture comprising tea leaves and dried soluble tea solids, the tea bag, when immersed in cold water for 90 seconds, providing a beverage having a theaflavin content at least 25% of the theaflavin content of a standard tea beverage. Preferably the beverage has a theaflavin content at least 40% of the theaflavin content of the standard tea beverage.

In a further aspect, this invention provides a method for preparing an iced tea beverage, the method comprising:

immersing a tea bag containing a tea mixture comprising about 30% to about 95% by weight of tea leaves and about 5% to about 70% by weight of dried soluble tea solids into water at a temperature of about 30° C. or less, extracting soluble tea solids from the tea mixture for a period of about 10 minutes or less to provide a tea extract; and removing the tea bag from the tea extract.

The soluble tea solids are preferably extracted from the tea mixture for a period of about 1 to 5 minutes.

In another aspect, this invention provides a method for preparing an iced tea bag, the method comprising thermally treating tea leaves at a temperature of at least 80° C.;

combining the thermally treated leaves with soluble tea solids to provide a tea mixture comprising about 30% to about 95% by weight of tea leaves and about 5% to about 70% by weight of dried soluble tea solids;

packaging the tea mixture in a tea bag.

In this specification, the term "standard tea beverage" means a tea beverage which is prepared by immersing 2 single-serve tea bags in 1 liter of water at 75° C. for 5 minutes.

DETAILED DESCRIPTION OF THE PREFERRED EMBODIMENTS

This invention is based upon the finding that a highly acceptable iced tea beverage may be rapidly produced in cold water from a tea bag which contains tea leaves and soluble tea solids.

The tea leaves used in the tea bag may be any suitable tea leaves commonly used in tea bags. Preferably the tea leaves are black tea leaves; that is tea leaves which have been fully enzymatically oxidized during production from green tea leaves. Further, the tea leaves are preferably selected to provide optimum extraction at reduced temperatures. Tea leaves of this nature may be readily determined by persons skilled in the art. Examples of suitable tea leaves include Malabar Indonesian tea leaves, Nusantara Indonesian tea leaves, Papua New Guinea tea leaves, and mixtures of these tea leaves.

The tea leaves are preferably thermally treated to reduce microbial contamination; for example steam treated. This may be done by passing steam over the tea leaves to raise the temperature of the leaves to at least about 80° C.; for example about 85° C. to about 95° C. The treatment may be carried out in less than 20 seconds; for example about 3 to about 15 seconds. The tea leaves are preferably dried after the steam treatment.

The soluble tea solids may be produced by suitably extracting tea solids from tea leaves using hot water. For example, the extraction may be carried out in a battery of fixed bed reactors connected in series. The tea leaves are packed into the reactors to provide a packed bed and then a hot extraction liquid is caused to flow through each reactor, from one reactor to the next. Apart from the first reactor which receives fresh extraction liquid, the hot extraction liquid fed into any reactor is that leaving a previous reactor in the series. At the end of an extraction cycle, the spent tea leaves in the first reactor are removed and the second reactor becomes the first reactor. A reactor containing fresh tea leaves is then connected as the last reactor in the series and the process repeated. The hot extraction liquid leaving the battery of reactors forms the tea extract.

The tea extract may be treated to solubilize tannins in it so that they are soluble in cold water. This may be accomplished by removing the tannins from the tea extract by cooling the extract to precipitate the tannins. The tannins may then be subjected to oxidation in the presence of an oxidizing agent, an oxidation catalyst, and, if required, a base. Suitable oxidizing agents are hydrogen peroxide, ozone, oxygen, mixtures of these gases with air, and the like. Thereafter, the treated tannins may be recombined with the tea extract from which they were removed. The tea extract may then be processed as usual into tea powder or a tea concentrate. Suitable solubilization processes are described in U.S. Pat. Nos. 3,787,590 and 4,156,024; the disclosures of which are incorporated by reference. Solubilizing the tannins in this manner reduces the cloudiness and turbidity of the beverage.

The tea extract may then be subjected to further processing to produce tea concentrates, soluble freeze- or spray-dried tea powder, or other products containing soluble tea solids as desired.

If it is desired to have a mixture of tea leaves and soluble tea powder in the tea bag, the soluble tea solids are suitably provided in the form of soluble freeze- or spray-dried tea powder. However, for better visual appearance, the soluble tea solids are preferably coated on the tea leaves. This may be accomplished by spraying a tea concentrate onto the tea leaves and drying the leaves; either simultaneously or in separate steps. The coating process may be carried out in any suitable coating apparatus; for example a fluidized bed drier, a rotary coater, and the like.

The tea leaves preferably provide about 30% to about 95% by weight of the tea mixture; more preferably about 70% to about 90% by weight. The dried soluble tea solids provide about 5% to about 70% by weight of tea mixture; more preferably about 10% to about 30% by weight.

A tea flavor or aroma may be incorporated into the tea mixture. This is suitably accomplished by adding the flavor or aroma to the tea concentrate prior to coating of the soluble tea solids on the tea leaves. In this way, the tea flavor or aroma becomes encapsulated in the coating of soluble tea solids. Alternatively, powdered flavors or aromas may be simply added to the tea mixture. As a further alternative, the tea flavor or aroma may be sprayed onto the coated tea leaves. As a yet further alternative, the tea flavor or aroma may be encapsulated and the capsules mixed with the tea mixture. The tea flavor or aroma may be a natural flavor or aroma obtained from tea leaves or may be an artificial flavor or aroma.

The tea mixture is then transported to a suitable filling machine in which a selected amount of the tea mixture is filled into tea bags. Suitable filling machines are well known in the art. Any suitable material may be used for making the tea bags. These materials are commercially available. For single serving tea bags, about 2 g to about 3.5 g tea mixture may be filled into each bag. Tea bags for providing larger amounts of beverage may also be provided; for example a tea bag for providing about 1 liter of ice tea beverage may contain about 9 to about 11 g of tea mixture.

The tea bag, when placed into cold water at a temperature of 30° C. or less, provides a beverage of good color and flavor within a reasonably short extraction time. For example, a tea bag which contains about 2.6 g of the tea mixture provides a beverage of color, when immersed in 250 ml of water at 22° C. for about 90 seconds minutes with continuous stirring and measured at 420 nm using a spectrophotometer (for example a Spectronic 20 D spectrophotometer) at a cuvet pathlength of 1 cm, of about 0.80 to about 1.

Similarly, a tea bag which contains about 10 g of the tea mixture provides a beverage of color, when immersed in 1 liter of water at 22° C. for about 90 seconds minutes with continuous stirring and measured at 420 nm and using a cuvet pathlength of 1 cm, of about 0.80 to about 1. This is considerably higher than would be achieved using conventional tea bags.

EXAMPLES

The following examples are submitted to illustrate the most preferred embodiments of the invention. All percentages are given by weight unless otherwise noted.

Example 1

A tea extract is prepared using a battery of fixed bed reactors. The extract is concentrated to about 40% by weight of soluble tea solids.

Malabar Indonesian tea leaves are placed into a rotating drum. The drum is put into operation and the concentrated extract is sprayed into the drum. Sufficient concentrated extract is sprayed into the drum such that the soluble tea solids in the extract provide about 15% by weight of the total dried weight of the tea leaves and soluble tea solids. The wet tea mixture is then fed into a fluidized bed drier. The drier is put into operation and operated until the moisture content of the mixture of tea leaves and soluble tea solids is about 3 to about 7% by weight.

The tea mixture is removed from the drier and examined. Each tea leaf is coated with a coating of soluble tea solids.

The tea mixture is then filled into single serving tea bags using a conventional filling machine and tea bag material. Each bag receives about 2.2 g to about 2.7 g of the tea mixture.

A tea bag is placed in 250 ml of water at 22° C. with continuous gentle stirring. After 90 seconds, the tea bag is removed. The beverage obtained has an acceptable tea color to the eye. The color is determined, using a Spectronic 20 D spectrophotometer at 420 nm absorbance and at a cuvet pathlength of 1 cm, to be about 0.6 to about 0.9. After about 3 minutes, the color is about 0.9 to about 1.3. Also, the beverage has a good tea flavor with brewed tea notes.

Example 2

The process of example 1 is repeated using Nusantara Indonesian tea leaves. A tea bag is placed in 250 ml of water at 22° C. After 90 seconds, the tea bag is removed. The beverage obtained has an acceptable tea color to the eye. The color is determined, using a Spectronic 20 D spectrophotometer at 420 nm absorbance and at a cuvet pathlength of 1 cm, to be about 0.9. Also, the beverage has a good tea flavor with brewed tea notes.

Example 3

The process of example 1 is repeated using Papua New Guinea tea leaves. A tea bag is placed in 250 ml of water at 22° C. After 90 seconds, the tea bag is removed. The beverage obtained has an acceptable tea color to the eye. The color is determined, using a Spectronic 20 D spectrophotometer at 420 nm absorbance and at a cuvet pathlength of 1 cm, to be about 0.9. Also, the beverage has a good tea flavor with brewed tea notes.

Example 4

Three types of tea bag are used in the trial. Tea Bag 1 is the tea bag of example 1. Tea Bag 2 is the tea bag of example 2. Tea Bag A is a commercially available tea bag (Lipton's). Each tea bag is immersed in 250 ml of water at 22° C. for 90 seconds. Further, 2 bags of Tea Bag A are immersed in a liter of water at 75° C. for 5 minutes. The bags are then removed from the water and each beverage is cooled to 10° C. The beverages are then analyzed for color, flavor and appearance. The results are as follows:

| Tea Bag | Water Temp ° C. | Color/ Absorbance | Flavor |
| --- | --- | --- | --- |
| 1 | 22 | Good/0.9 | Good tea flavor with brewed tea notes. |
| 2 | 22 | Good/0.9 | Good tea flavor with brewed tea notes. |
| A | 22 | Poor, watery/0.4 | Poor, watery flavor. No body. |
| A | 75 | Good/0.9 | Good tea flavor with brewed tea notes. |

Example 5

Three types of tea bag are used in the trial. Tea Bag 1 is the tea bag of example 1. Tea Bag 2 is the tea bag of example 2. Tea Bag A is a commercially available tea bag (Lipton's). Tea bags 1 and 2 are immersed in 250 ml of water at 22° C. for 90 seconds and for 3 minutes. A standard tea beverage is prepared from Tea Bag A.

The theaflavin content of each beverage is then determined using a gas chromatograph. The theaflavin content of the beverages produced from Tea Bags 1 and 2 at 90 seconds immersion is about 40% of the theaflavin content of the standard tea beverage produced from Tea Bag A. The theaflavin content of the beverages produced from Tea Bags 1 and 2 at 3 minutes immersion is about 55% of the theaflavin content of the standard tea beverage produced from Tea Bag A.

Example 6

A tea extract is prepared using a battery of fixed bed reactors using a mixture of high quality and dark tea leaves in a ratio of about 9:1. The extract is concentrated to about 45% by weight of soluble tea solids. The concentrated tea extract is rapidly heat treated at about 85° C.

Papua New Guinea tea leaf is blended with Jasmine tea leaf in a weight ratio of about 16:1. The blend is placed into a rotating drum and steam is injected into the drum until a leaf temperature of about 90° C. is reached. The residence time in the drum is about 5 to 10 seconds. The blend is then dried. The dried blend is placed into a rotating drum and the concentrated extract is sprayed into the drum at a temperature of about 55° C. Sufficient concentrated extract is sprayed into the drum such that the soluble tea solids in the extract provide about 15% by weight of the total dried weight of the tea leaves and soluble tea solids. The spraying is done in two passes. During the second pass, a tea flavor is added by incorporating it into the concentrated extract immediately prior to spraying.

The wet tea mixture is then fed into a fluidized bed drier. The drier is put into operation and operated until the moisture content of the mixture of tea leaves and soluble tea solids is about 3 to about 7% by weight. The tea mixture is removed from the drier and examined. Each tea leaf is coated with a coating of soluble tea solids.

The tea mixture is then filled into multi-serve bags using a conventional filling machine and tea bag material. Each bag receives about 9.5 g of the tea mixture. Each bag contains sufficient tea mixture to provide about 1 liter of iced tea beverage.

Color testing is then carried out. Tea Bag 3 is the tea bag of this example. Tea bag A is a commercially available tea bag (Lipton's). Tea bag B is a commercially available tea bag (Red Rose). Tea bag C is a commercially available tea bag (Luzianne). Tea bag 3 is immersed in about 1.1 l of water at 22° C. for various times. Sufficient numbers of the commercially available tea bags to provide substantially the same amount of tea leaves are immersed in about 1.1 l of water at 22° C. for various times. The beverages are then analyzed for color. The results are as follows:

| Extraction Time/minutes | Absorbance Tea bag 3 | Absorbance Tea bag A | Absorbance Tea bag B | Absorbance Tea bag C |
| --- | --- | --- | --- | --- |
| 1.5 | 0.8 | 0.295 | 0.300 | 0.320 |
| 3 | 1.140 | 0.430 | 0.460 | 0.430 |
| 5 | 1.386 | 0.555 | 0.610 | 0.560 |
| 7 | 1.535 | 0.670 | 0.740 | 0.655 |
| 9 | 1.625 | 0.750 | 0.840 | 0.730 |

The tea beverage produced from tea bag 3 has good tea flavor with brewed tea notes. The beverage also has good tea astringency. The tea beverages produced from tea bags A to C are watery and of poor flavor.

The theaflavin content of the beverage produced by tea bag 3 at an extraction time of 3 minutes is then determined using a gas chromatograph. The theaflavin content is at least 60% of the theaflavin content of a standard tea beverage produced from Tea Bag A.

What is claimed is:

1. A tea bag for making ice tea beverages by steeping the bag and extracting the tea in cold water, the tea bag containing a tea mixture comprising both: about 30% to about 95% by weight of black tea leaves and about 5% to about 70% by weight of dried, cold water soluble tea solids, the black tea leaves being selected from the group consisting of Malabar Indonesian tea leaves, Papua New Guinea tea leaves, and combinations of these tea leaves; the tea bag providing a beverage having a color of at least about 0.7 absorbance at 420 nm when using a cuvet path length of 1 cm when immersed in 250 ml of water at 22° C. for about 90 seconds at a tea mixture concentration of about 10 g/l.

2. A tea bag according to claim 1 in which the tea leaves are thermally treated tea leaves.

3. A tea bag according to claim 2 in which the tea leaves are steam treated tea leaves.

4. A tea bag according to claim 1 in which the tea mixture further comprises tea flavor or aroma.

5. A tea bag according to claim 1 in which the tea mixture contains about 70% to about 90% by weight of tea leaves.

6. A tea bag according to claim 1 in which the soluble tea solids coat the tea leaves.

7. A tea bag for making ice tea beverages by steeping the bag and extracting the tea cold water, the tea bag containing a tea mixture comprising black Papua New Guinea tea leaves and dried, cold water soluble tea solids, the tea bag providing a beverage having a color of at least about 0.7 absorbance at 420 nm when using a cuvet pathlength of 1 cm when immersed in 250 ml of water at 22° C. for about 90 seconds at a tea mixture concentration of about 10 g/l.

8. A tea bag for ice tea beverages according to claim 7 which comprises about 30% to about 95% by weight of tea leaves; and about 5% to about 70% by weight of dried soluble tea solids.

9. A tea bag according to claim 7 in which the tea leaves are thermally treated tea leaves.

10. A tea bag according to claim 9 in which the tea leaves are steam treated tea leaves.

11. A tea bag according to claim 7 in which the dried soluble tea solids contain solubilized tannin components.

12. A tea bag according to claim 7 in which the tea mixture further comprises tea flavor or aroma.

13. A tea bag according to claim 7 in which the soluble tea solids coat the tea leaves.

14. A tea bag for making ice tea beverages by steeping the bag and extracting the tea in cold water, the tea bag containing a tea mixture comprising both black tea leaves and dried, cold water soluble tea solids, the black tea leaves selected from the group consisting of Malabar Indonesian tea leaves, Papua New Guinea tea leaves and combinations of these tea leaves, the tea bag, when immersed in cold water for 90 seconds, providing a beverage having a theaflavin content of at least 25% of the theaflavin content of a standard tea beverage.

15. A tea bag according to claim 14 which provides a beverage having a theaflavin content of at least 40%o of the theaflavin content of a standard tea beverage.

16. A tea bag for ice tea beverages according to claim 14 which provides a beverage having a color of at least about 0.7 absorbance at 420 and using a cuvet pathlength of 1 cm when immersed in 250 ml of water at 22° C. for about 90 seconds at a tea mixture concentration of about 10 g/l.

17. A tea bag for ice tea beverages according to claim 14 which comprises about 30% to about 95% by weight of tea leaves; and about 5% to about 70% by weight of dried soluble tea solids.

18. A tea bag according to claim 14 in which the tea leaves are thermally treated tea leaves.

19. A tea bag according to claim 14 in which the tea leaves are steam treated tea leaves.

20. A tea bag according to claim 14 in which the tea mixture further comprises tea flavor or aroma.

21. A tea bag according to claim 14 in which the soluble tea solids coat the tea leaves.

* * * * *

UNITED STATES PATENT AND TRADEMARK OFFICE
CERTIFICATE OF CORRECTION

PATENT NO. : 6,235,323 B1
DATED : May 22, 2001
INVENTOR(S) : Carns et al.

It is certified that error appears in the above-identified patent and that said Letters Patent is hereby corrected as shown below:

Column 6,
Line 49, change "Guinca" to -- Guinea --.
Line 66, change "tea cold" to -- tea in cold --.

Column 8,
Line 5, change "40%o" to -- 40% --.

Signed and Sealed this

Nineteenth Day of February, 2002

Attest:

Attesting Officer

JAMES E. ROGAN
*Director of the United States Patent and Trademark Office*